United States Patent [19]
Seitz

[11] 3,864,966
[45] Feb. 11, 1975

[54] LOAD TRANSDUCER

[76] Inventor: William K. Seitz, 5342 Windswept, Houston, Tex. 77027

[22] Filed: Mar. 14, 1973

[21] Appl. No.: 341,061

[52] U.S. Cl. ................................ 73/141 A, 338/3
[51] Int. Cl. ............................................ G01l 1/22
[58] Field of Search ................ 73/141 A, 88.5 R; 33/147 D, 148 D; 338/3, 5, 6

[56] References Cited
UNITED STATES PATENTS

| | | | |
|---|---|---|---|
| 2,422,806 | 6/1947 | Silverman et al. | 73/141 A X |
| 3,082,621 | 3/1963 | Soderholm | 73/88 R |
| 3,084,297 | 4/1963 | Glerum | 73/141 A X |
| 3,108,470 | 10/1963 | Martin | 73/88.5 R |
| 3,171,276 | 3/1965 | Sanchez et al. | 73/88.5 R |
| 3,266,303 | 8/1966 | Pfann | 73/141 A |
| 3,351,880 | 11/1967 | Wilner | 73/88.5 R X |

*Primary Examiner*—Charles A. Ruehl
*Attorney, Agent, or Firm*—Richards, Harris & Medlock

[57] ABSTRACT

A load transducer for accurately measuring force, be it load, weight, pressure or acceleration under widely varying ambient temperature and environmental conditions includes a load member coupled to a stress producing force that changes the longitudinal dimension of the member. Clamped to the load member, at a near center location thereof, is a thermal compensating bar having substantially the same coefficient of thermal expansion as the load member. The free end of the compensating bar is in proximity with a surface of the load member and this surface has extending therefrom a cantilever beam supporting strain responsive elements such that a change in the longitudinal direction of the load member forces one of the strain responsive elements under a compressive load and the second strain responsive element under a stretching load. These elements are connected in adjacent arms of a bridge circuit. To improve the transducer accuracy, a silicon rubber bonds the cantilever beam to the load member.

13 Claims, 4 Drawing Figures

PATENTED FEB 11 1975           3,864,966

LOAD TRANSDUCER

This invention relates to electromechanical transducers for converting mechanical displacement into electrical signals, and more particularly to a load transducer compensated for various ambient temperature and environmental conditions.

Electromechanical transducers of the type to which this invention relates commonly employ, whether they be used for measuring acceleration, velocity, pressure or the relative displacement of two mechanical parts or the strain in the single mechanical parts, a transducing element for detecting the relative displacement of two parts and for developing a corresponding electric signal. Such relative displacement is measured with various kinds of strain gauges with the recent development of the semiconductor strain gauge almost completely replacing other older design strain gauges.

Heretofore, electromechanical load transducers required radical thermal compensation to minimize the generation of an apparent stress signal from the strain responsive elements due to changes in the relative dimension of the various transducer components. Another shortcoming of many presently available known transducers is that they are subject to error due to an axial rotation of the main load member. Such an axial rotation is usually developed by the normal elongation or compression of the load member in response to an applied stress. The axial rotation within the load member produces an error signal at the strain responsive element by introducing additional strain into the element not resulting from the normal longitudinal dimensional change of the load member.

A feature of the present invention is to provide a load transducer wherein materials having a similar coefficient of thermal expansion are utilized to minimize the need for radical thermal compensation of the transducer output. A further feature of the present invention is to provide a load transducer wherein the stress responsive load member and a compensating bar are interconnected to minimize the effect of axial rotation. Still another feature of the present invention is to provide a load transducer wherein the strain responsive elements are mounted to a load member by an elastic material to further minimize axial rotation effects on the transducer element. Yet another feature of the present invention is to provide a load transducer wherein strain responsive elements are connected in adjacent arms of a bridge circuit and mounted on a material having a similar coefficient of thermal expansion to further minimize an error voltage output from the strain responsive elements.

As used in this specification, the term strain responsive element refers to an element which is employed to measure displacements, forces or other physical phenomena due to the strain produced in the element. Such strain is also associated with a stress that occurs in the element concurrently with the strain. In practice, the strain responsive element is often employed as a force sensor, that is, it is mounted such that the relative dimensional displacement between two parts produced by a force applied to one produces a strain in an amount which depends upon the force. Thus, a strain responsive element is considered a device for converting a mechanical stress into an electrical indication.

In accordance with the present invention, a load transducer is provided for measuring a stress-strain relationship by responding to a change in a longitudinal dimension of a load member coupled to a stress producing force. A thermal compensation bar is attached to the load member in proximity thereto to be subject to the same ambient temperature and environmental conditions. Strain responsive elements are fastened to the load member and coupled to the thermal compensation bar and generate an electrical output varying with the change in longitudinal dimension of the load member with respect to the compensating bar.

A more complete understanding of the invention and its advantages together with various features thereof, will be understood more fully from the following specification taken in conjunction with the accompanying drawings wherein.

Figure 1:
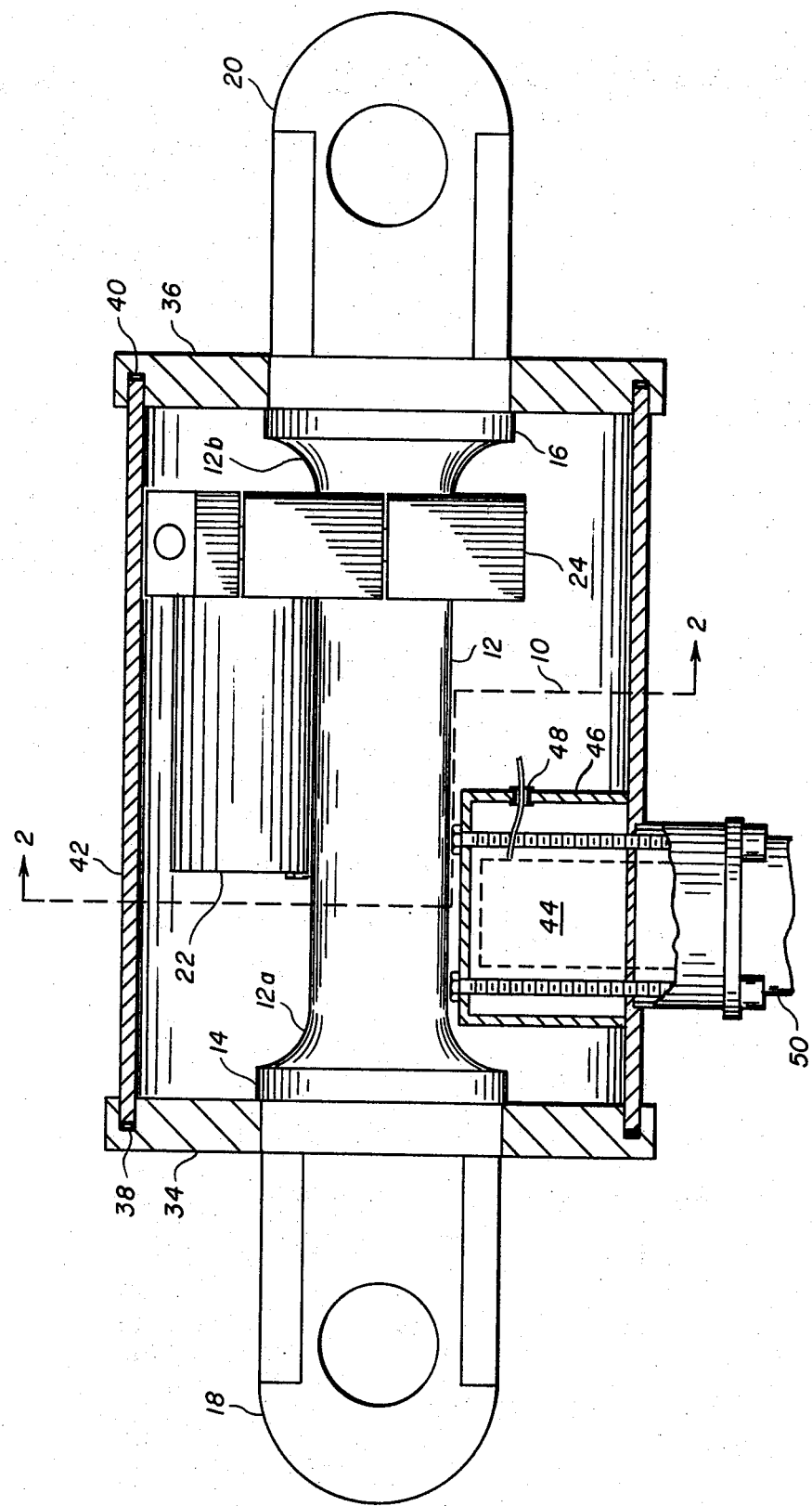
FIG. 1 is a side view, partially in section, of a load transducer employing a compensating bar to provide a strain in a responsive element to produce a force signal.
Figure 2:
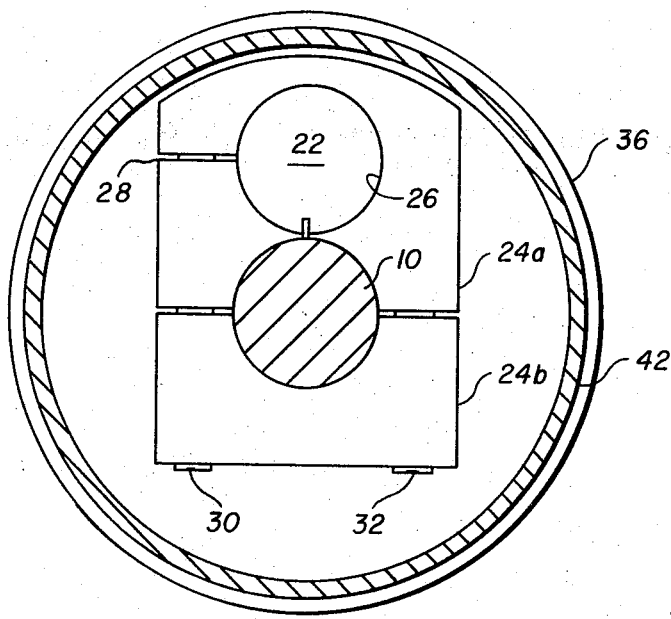
FIG. 2 is a sectional view of FIG. 1 taken along the line 2—2 and illustrating the proximity of the thermal compensating bar with relation to the primary load member.

In referring to the various parts and components of the load transducer, it should be borne in mind that it is the relative sizes to which reference is made, since the total length of the transducer may be smaller than that illustrated in the FIGURES.

Referring to the FIGURES, there is shown a load transducer having a load member 10 with a main section 12 between shoulders 14 and 16. Extending from the shoulder 14 is a clamping tab 18 and extending from the shoulder 16 is a clamping tab 20. Between the shoulders 14 and 16, the main section 12 has a cylindrical shape with curved transition areas 12a and 12b to minimize localized stress points when the load transducer is coupled to a stress producing force.

Toward the center of the load member 10 in the main section 12 there is located a thermal compensation bar 22 that is fastened to the main section by means of a clamp 24. As illustrated, the clamp 24 includes a first part 24a having an opening 26 for receiving the thermal compensation bar 22. A slot 28 provides for a reduction of the size of the opening 26 to firmly clamp the thermal compensation bar 22 by means of a bolt 30. A second part 24b of the clamp mates with the first part 24a to encircle the main section 12 and by means of the bolt 30 and a bolt 32 securely positions the thermal compensation bar 22 in proximity of the main section 12.

By this arrangement, with the compensation bar 22 located toward the center of the load member 10 there is the potential of producing a measurement of the stress of a small length of the main section 12. This arrangement further reduces the effect of axial rotation of the load member 10 by providing that the thermal compensation bar rides with and moves in the same direction of axial rotation as the load member. The percentage reduction in the effect of the axial rotation of the load member is equal to the ratio between the length of the load member 10 and the length of the stretched area to be measured. By properly sizing the length of the thermal compensation bar 22 with respect to the main section 12, errors due to axial rotation are minimized.

To further improve the accuracy of the load transducer of the present invention, each part of each individual transducer is produced from material having the same coefficient of thermal expansion. Thus, both the load member 10 and the thermal compensation bar 22 are constructed of a high quality homogenous alloy steel, preferably from the same mill run, to insure that they have the same coefficient of thermal expansion. Providing parts of the transducer from materials having the same coefficient of thermal expansion minimizes the need for radical thermal compensation of the device.

Further improvement in the operation of the load transducer is provided by enclosing the essential operating components within a housing. An end plate 34 is fit over the tab 18 against the shoulder 14. A similar end plate 36 is fit over the tab 20 against the shoulder 16. Each of the end plates 34 and 36 is constructed with an annular groove located toward the circumference thereof. Within the annular groove of the end plate 34 there is an O-ring seal 38 and within the groove of the end plate 36 there is an O-ring 40. The housing further includes a cylindrical case 42 having one end fitted into the groove of the end plate 34 and the second end fitted into the groove of the end plate 36. This provides a sealed chamber for the main section 12 and the thermal compensation bar 22 to further improve and minimize the effects of thermal changes on the unit.

Also included within the housing is electrical circuitry 44 including signal conditioners and an operational amplifier. The circuitry 44 is enclosed within a case 46 having an opening fitted with a grommet 48 through which lead wires extend to the strain responsive elements, to be described. A connector 50 extending through the case 42 provides a means for coupling the output of the transducer to recording or indicating apparatus (not shown).

Figure 3:
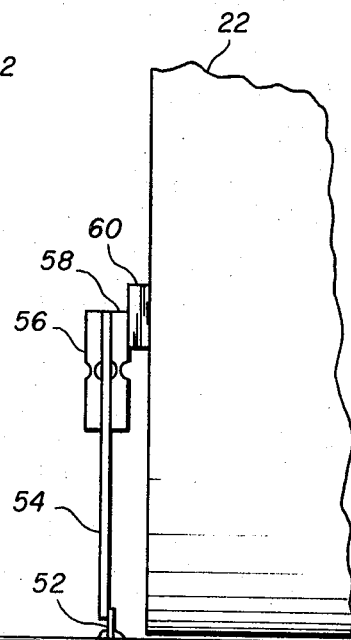
FIG. 3 is an expanded view of a cantilever type mounting of a pair of strain responsive elements arranged to respond to the longitudinal dimensional change between the main load member and the thermal compensating bar.

Referring specifically to FIG. 3, there is shown an enlarged view for mounting strain elements responsive to a change in the longitudinal dimension of the load member 10 with respect to the temperature compensation bar 22. A load arm 52 is welded or otherwise attached to the section 12 and extends therefrom in a direction of the free end of the temperature compensation bar 22. Attached to the load arm 52 by means of a silicon rubber bond is a strain gauge beam 54.

The silicon rubber bond between the beam 54 and the arm 52 allows for a considerable amount of lateral elasticity in relation to the proper longitudinal direction. The proper longitudinal direction being defined and determined by the manner in which the transducer is used, that is, in a stretching or compressive mode. Thus, the strain gauge beam 54 is attached to the load arm 52 so that it will be pushing the strain responsive elements into a stress situation rather than pulling it into a stress condition. As illustrated, the transducer is assembled to operate in a stretching mode and to operate in a compressive mode the strain gauge beam 54 is mounted to the opposite side of the arm 52.

As illustrated, the load arm 52 and the strain gauge beam 54 form a cantilever beam extending over the free end of the compensating bar 22. At the outboard end of the beam 54 there is mounted the strain responsive elements including an element 56 and an element 58.

The strain responsive elements 56 and 58 are preferably of a silicon semiconductor material of P-type. This type of material is especially advantageous to use since it has a higher gauge factor, a higher yield point and a higher Youngs Modulus than that of N-type material. However, N-type material may be employed.

To further minimize any thermal errors in the transducer, the strain gauge beam 54 is made of the same material as the elements 56 and 58, that is, if the elements are semi-conductor material of a P-type then the beam is made of a silicon material similar to P-type. Therefore, both the elements 56 and 58 and the beam 54 are thermally stable in that each part has the same coefficient of thermal expansion thus further minimizing thermal variation error at the output of the transducer.

As illustrated, the strain responsive elements 56 and 58 are mounted to avoid direct contact with the thermal compensation bar 22. A ceramic gauge pad 60 is attached to the free end of the compensation bar 22 and is also attached to the outboard end of strain responsive element 58.

Figure 4:
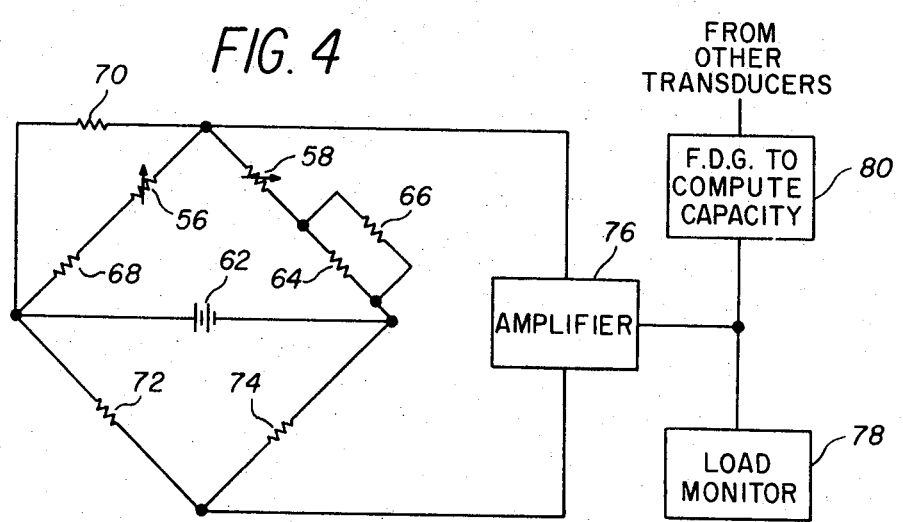
FIG. 4 is a schematic diagram of a bridge circuit incorporating strain responsive elements of the transducer of FIG. 1.

Referring to FIG. 4, there is shown a schematic of the electrical circuit 44 including the strain responsive elements 56 and 58 in adjacent arms of a bridge circuit. The bridge is energized from a source of DC voltage such as the battery 62. In series with the element 58 is a resistor 64 with a temperature compensation resistor 66 parallel therewith. In series with the element 56 is a resistor 68 and this arm of the bridge is in parallel with a balance resistor 70. The resistors 66 and 70 are shown for one condition of offset for the bridge, for an offset in a different direction these resistors are connected in other arms of the bridge. The bridge is completed by resistors 72 and 74 in arms opposite from the elements 56 and 58, respectively.

A voltage output from the bridge that varies in accordance with the strain on the elements 56 and 58 is coupled to the input of a signal conditioner and amplifier circuit 76 having an output tied to a load monitor 78 which may be a visual display or recorder. An output from the amplifier 76 may also be coupled to a computer 80 along with other transducers to compute the load distribution for a complex of load transducers.

In operation of the bridge circuit, the difference between the resistances of the two arms containing the elements 56 and 58 are being measured. The positive arm, e.g., element 56, is in compression, while the negative arm (element 58) is in a stretching mode. As long as the outside forces, that is, other than strain forces, on the strain responsive elements are equal, be it thermal or mechanical, there will be no shift in the balance of the bridge. For example, a lateral force applied to the strain gauge beam 54 will cause the positive arm of the element 56 and the negative arm of the element 58 to be stressed in the same direction, causing a shift in the resistance in each arm of the bridge. This shift in resistance will be identical in each arm and in the same direction and will therefore not produce a change in the difference between the ohmic value of the two bridge arms.

When a current is passed through the strain responsive elements 56 and 58 as connected in adjacent bridge arms it produces heat which changes the resistance of the silicon elements. However, since both the elements 56 and 58 and the strain gauge beam 54 are constructed from similar material, the thermal changes produced by the current effect both arms simultaneously, causing identical temperature balance. Since the output of the bridge varies with the difference between the ohmic values in adjacent arms any changes that effect the bridge in the same manner having a nulling effect. Thus, improved temperature compensation is provided.

While only one embodiment of the invention, together with modification thereof, has been described in detail herein and shown in the accompanying drawings, it will be evident that various further modifications are possible without departing from the scope of the invention.

What is claimed is:

1. A load transducer for measuring a stress-strain relationship by a change in the longitudinal dimension, comprising in combination:
   a load member coupled to a stress producing force resulting in a change in the longitudinal dimension of said member;
   a thermal compensation bar;
   means for attaching the thermal compensation bar to said load member adjacent one end thereof such that a free end of the thermal compensation bar is at a near midpoint location of the load member; and
   strain responsive means fastened to said load member and coupled to said thermal compensation bar proximal a surface of the free end of said compensation bar and generating an electrical output varying with the change in longitudinal dimension of said load member with respect to said compensation bar.

2. A load transducer as set forth in claim 1 wherein said strain responsive means includes a cantilever beam bonded to said load member and a first strain responsive element attached to one side of said beam and a second strain responsive element attached to an opposite side of said beam such that for a change in longitudinal dimension of the load member one element responds to a compressive load and the second element responds to a stretching load.

3. A load transducer as set forth in claim 2 wherein one of the strain responsive elements is connected in one arm of a bridge circuit and the second element is connected in an adjacent arm.

4. A load transducer as set forth in claim 2 wherein the strain responsive elements and said cantilever beam have substantially the same coefficient of thermal expansion.

5. A load transducer as set forth in claim 1 wherein said load member and said thermal compensation bar have substantially the same coefficient of thermal expansion.

6. A load transducer for measuring a stress-strain relationship by a change in longitudinal dimension, comprising in combination:
   a load member coupled to a stress producing force resulting in a change in the longitudinal dimension of said member;
   a thermal compensation bar;
   means for attaching the thermal compensation bar to said load member adjacent one end thereof such that a free end of the compensation bar is at a near midpoint location of the load member;
   a load arm extending from said load member to be proximal a surface of the free end of said thermal compensation bar; and
   strain responsive means fastened to said load arm and coupled to said thermal compensation bar and generating an electrical output varying with the change in longitudinal dimension of said load member with respect to said compensation bar.

7. A load transducer as set forth in claim 6 wherein said strain responsive means includes a cantilever beam bonded to said load arm and a first strain responsive element attached to one side of said beam and a second strain responsive element attached to an opposite side of said beam such that for a change in longitudinal dimension of the load member one element responds to a compressive load and the second element responds to a stretching load.

8. A load transducer as set forth in claim 7 wherein the strain responsive elements and said cantilever beam have substantially the same coefficient of thermal expansion.

9. A load transducer as set forth in claim 6 including an electrical and thermal insulation pad attached to said thermal compensation bar to provide a barrier between said bar and the strain responsive elements.

10. A load transducer as set forth in claim 6 wherein said load member and said thermal compensation bar have substantially the same coefficient of thermal expansion.

11. A load transducer for measuring a stress-strain relationship by a change in longitudinal dimension, comprising in combination:
    a load member coupled to a stress producing force resulting in a change in the longitudinal dimension of said member,
    a thermal compensation bar having substantially the same coefficient of thermal expansion as said load member and attached thereto to have a free end in proximity of the load member in the same ambient conditions,
    a load arm extending from said load member to be proximal a surface of the free end of said thermal compensation bar,
    a cantilever beam bonded to said load arm and extending therefrom to be coupled to said compensation bar at the free end thereof,
    a pair of strain responsive elements, one attached to a first side of said beam and the second attached to an opposite side of said beam such that for deflection of the beam by a change in the longitudinal dimension of the load member one element responds to a compressive load and the second element responds to a stretching load, said strain responsive elements and said beam having substantially the same coefficient of thermal expansion,
    a bridge circuit having one strain responsive element in one arm thereof and the second strain responsive element in an adjacent arm, and
    an insulation pad for coupling the free end of said thermal compensation bar to said cantilever beam and providing a barrier between said bar and the strain responsive elements.

12. A load transducer as set forth in claim 11 including a silicon rubber bond between said cantilever beam and said load arm.

13. A load transducer as set forth in claim 12 wherein said thermal compensation bar is clamped to said load member adjacent to one end of said load member.

* * * * *